Oct. 19, 1943.  A. P. BEEBE  2,332,365
MECHANICAL MOVEMENT
Filed July 27, 1942  2 Sheets-Sheet 1
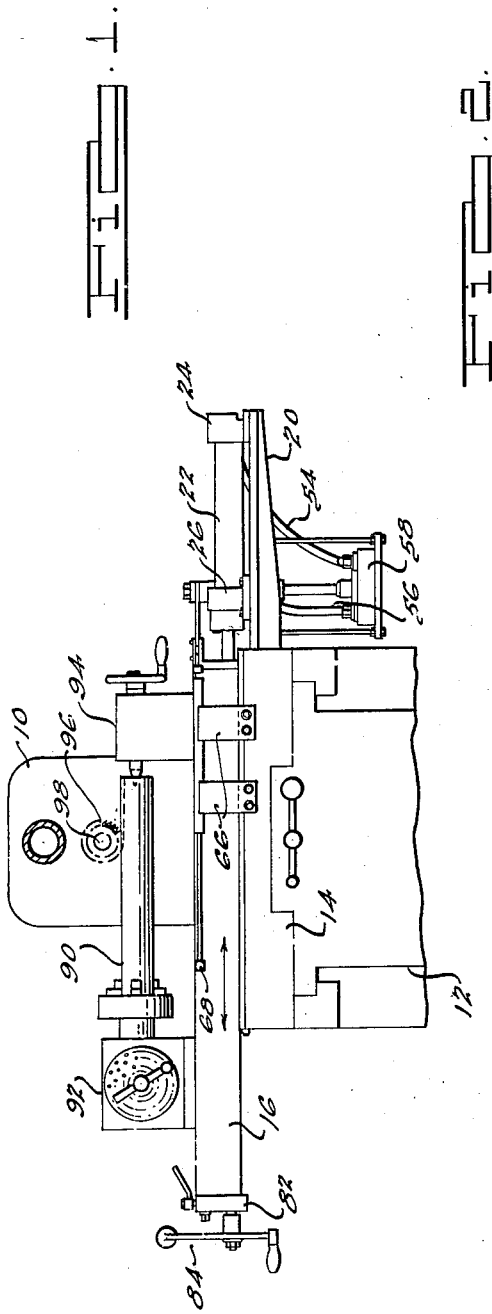
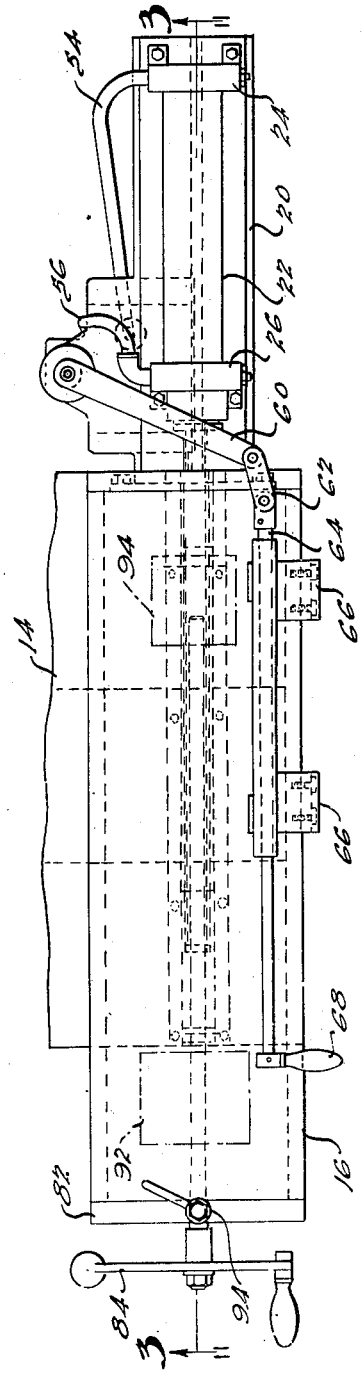
INVENTOR
Alan P. Beebe
BY
Harness, Dickey & Pierce
ATTORNEYS.

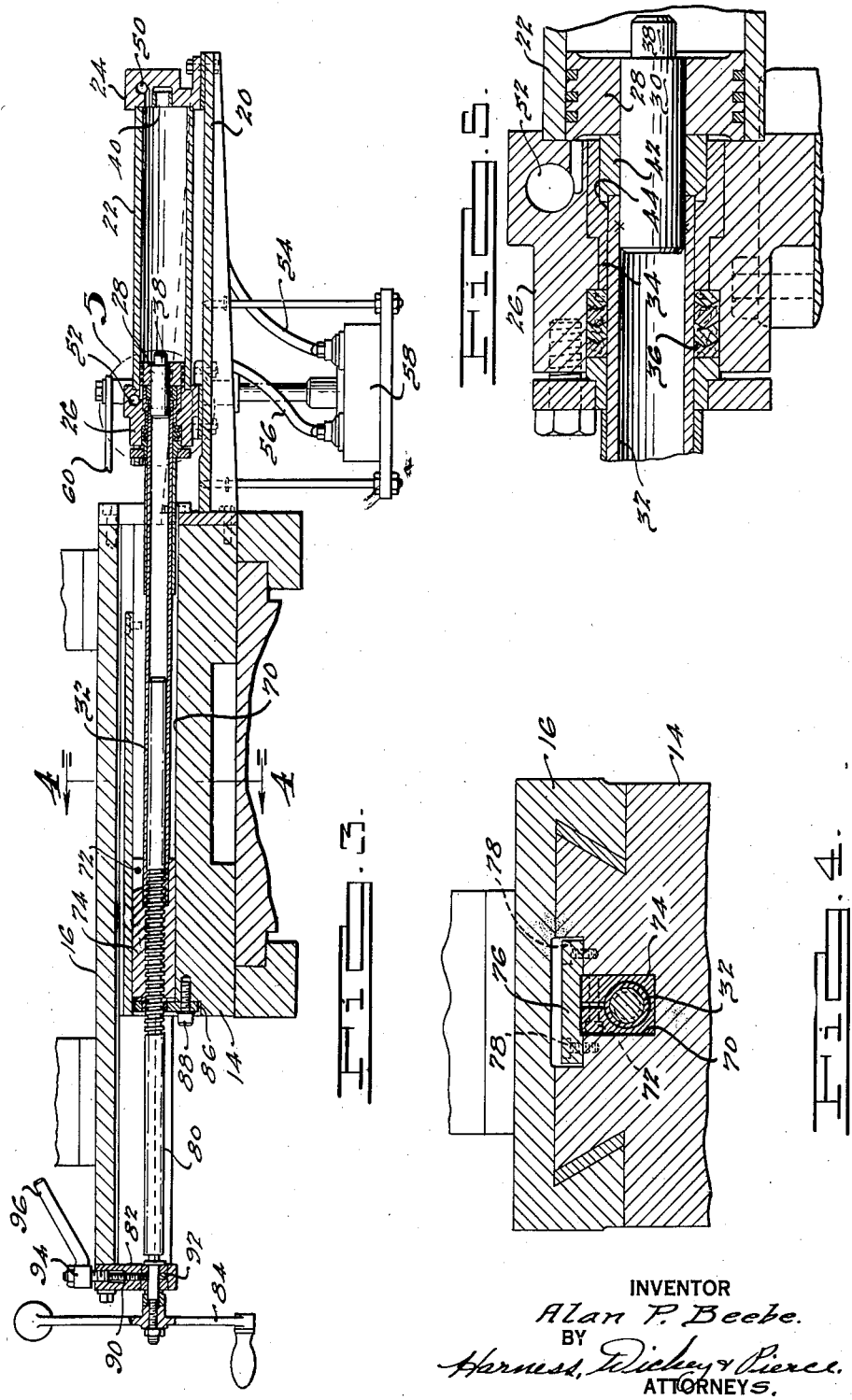

Patented Oct. 19, 1943

2,332,365

UNITED STATES PATENT OFFICE 2,332,365

MECHANICAL MOVEMENT

Alan P. Beebe, Grosse Pointe, Mich., assignor to Peninsular Grinding Wheel Co., Detroit, Mich., a corporation of Michigan Application July 27, 1942, Serial No. 452,448

2 Claims. (Cl. 121—45)

This invention relates to mechanical movements and particularly to one adaptable for use in the feeding of machine tool parts, the principal object being the provision of a construction wherein the feeding movement is accomplished through the use of a hydraulic cylinder and in which the extent of movement of the associated part may be quickly and readily varied to accommodate the desired operation.

Objects of the invention include the provision, in combination with a machine tool or the like having a part to be moved, of a hydraulic cylinder connected to said part for effecting such movement and means interposed in the connection between the hydraulic cylinder and the part capable of ready adjustment for varied extent of movement of the part; the provision, in combination with a machine tool or the like having a part adapted for feeding movement, a hydraulic cylinder for effecting feeding movement of such part and an interconnection between the hydraulic cylinder and the part capable of readily and quickly varying the relative position of the part and the hydraulic cylinder to determine the limit of travel of the latter through the former; the provision of a construction as above described in which the limit of travel of the part is determined by contact of the piston in the cylinder with the end of the cylinder; the provision of a construction as above described in which the connection between the hydraulic cylinder and the part to be moved thereby includes a screw-threaded connection capable of adjustment during operation or otherwise to vary the limit of travel of the part in one direction under the influence of the hydraulic cylinder; and the provision of a construction as above described in which manually operated means readily available to the operator of the machine, tool, or the like, are provided for varying the connection between the hydraulic cylinder and the part, and means are provided for locking the screw-threaded connection in its relatively adjusted position.

The above being among the objects of the present invention, the same consists in certain novel features of construction and combinations of parts to be hereinafter described with reference to the accompanying drawings, and then claimed, having the above and other objects in view.

In the accompanying drawings which illustrate a suitable embodiment of the present invention and in which like numerals refer to like parts throughout the several different views:

Fig. 1 is a fragmentary and more or less diagrammatic front elevational view of a milling machine to which the present invention is shown applied;

Fig. 2 is an enlarged, fragmentary plan view of the table of the milling machine shown in Fig. 1 and the apparatus of the present invention applied thereto;

Fig. 3 is a fragmentary, vertical sectional view taken on the line 3—3 of Fig. 2;

Fig. 4 is an enlarged, fragmentary, transverse sectional view taken on the line 4—4 of Fig. 3; and, Fig. 5 is an enlarged, fragmentary, vertical sectional view of that portion of the apparatus shown in Fig. 3 within the circle 5 thereof.

The present invention is applicable for use in connection with any machine tool having a table, slide or the like for supporting either a cutting tool or the like for movement relative to work, or for supporting work for movement relative to a cutting tool or the like, wherein a relative feeding movement between the work and the tool is accomplished by the use of a hydraulic cylinder and piston assembly. As a matter of illustration only, it is shown in the accompanying drawings as applied to the table of a milling machine, the description of its application to such use thereby making its application to controlling the relative feeding movement between the relatively movable parts of other machine tools obvious to those skilled in the art.

In accordance with the present invention, the relative movements between work and a cutter, for instance, can be so controlled that when a relative relation between the two has been obtained during a feeding movement, further relative feeding movement will be positively precluded and such point at which the feed is discontinued can be accurately determined and can be quickly and readily varied in setting up any job, even during operation of the machine tool, so as to vary the point at which the relative feeding movements between the work and the tool will terminate.

Referring to the drawings and particularly to Fig. 1 the milling machine there shown by way of illustration may be assumed to be a simple knee type plain milling machine having a column 10, a knee 12 upon the upper surfaces of which is supported the usual saddle 14 shiftable toward and from the front face of the column 10 in a conventional manner and upon which in turn a conventional table 16 is slidably supported for movement in a horizontal plane across the forward face of the column 10, the slidable connection between the table and the saddle being accomplished through the use of conventional dovetailed connection as illustrated in Fig. 4.

In accordance with the present invention a suitable support 20 is fixed to the righthand side of the saddle 14 as viewed in the figures and upon the support 20 is fixed a hydraulic cylinder 22 with its axis parallel with the direction of movement of the slide 16. The cylinder 22 is of a conventional type having heads 24 and 26 sealed to the opposite ends thereof and having a piston 28 reciprocable therein. The piston 28 is provided with a stub rod 30 fixed therein which extends toward the head 26, and on its lefthand projecting end is provided with a tubular piston rod 32 fixed thereto as best brought out in Fig. 5. The piston rod 32 is received in a suitable bushing 34 in the head 26 and suitable packing 36 cooperates between the rod 32 and the head 26 to prevent escape of liquid between the rod 32 and the head 26.

The righthand end of the stub rod 30, as viewed in the drawings, projects beyond the corresponding face of the piston 28 and is reduced in diameter at 38 as best brought out in Fig. 5. As indicated in Fig. 3, the head 24 is provided with a central recess 40 in which the end 38 is relatively closely received when the piston 28 is at the righthand end of limit of movement in the cylinder 22. Liquid is trapped in the recess 40 when the end 38 projects thereinto during movement of the piston 28 to the right and the fit between the end 38 and the recess 40 is such as to permit such trapped liquid to escape around the end 38 in a restricted manner so as to thus provide a cushioning effect when the piston 28 approaches this end of its movement and before it is actually stopped by contact with the head 24. A similar effect is obtained at the opposite end of the stroke of the piston 28 by the provision of an enlarged collar 42 on the stub rod 30 between piston rod 32 and the piston 28, the collar 42 being receivable in a recess 44 formed in the righthand end of the bushing 34 so as to trap liquid therein when the piston approaches the lefthand limit of its movable position in the cylinder 22 and to permit the liquid to escape in a restricted manner to cushion the movement of the piston 28 before it strikes the head 26 to limit its travel to the left.

The head 24 is provided with a liquid passage 50 leading to the inner face of the head within the cylinder 22 and the head 26 is provided with a similar passage 52 leading to the corresponding face thereof. The passages 50 and 52 are connected by tubes or pipes 54 and 56, respectively, which extend to a conventional valve mechanism 58 operation of which applies liquid under pressure from any suitable and conventional source (not shown) to either the passage 50 or 52 and communicates the other said passages with a point of discharge, so as to permit such liquid under pressure to be utilized in reciprocating the piston 28 to the cylinder 22.

The valve 58 is provided with an operating arm 60 which may be operated directly by the operator or through the intermediary of suitable linkages. In the drawings, by way of illustration, the operating lever 60 is connected by a short link 62 with an operating rod 64 extending along the outer face of the table 16 and suitably supported for reciprocatory movement from the saddle 14 by suitable members 66 fixed to the outer face of the latter, the rod 64 extending toward the lefthand end of the table 16 and there being provided with an operating handle 68 convenient to the operator.

As best brought out in Figs. 3 and 4 in the piston rod 32 projects through a groove 70 formed in the upper face of the saddle 14 centrally of the table 16 supported thereon, and fixed to the lefthand end of the piston rod 32, as by means of a split joint and clamping screw 72, is a rectangularly sectioned nut 74 which is slidably received in the groove 70. The engagement between the nut 74 and the walls of the groove 70 prevents turning of the nut 74. A plate member 76 received in the laterally enlarged upper portion 78 of the groove 70 overlies the nut 74 and being fixed to the saddle 14 by means of screws 73 serves to maintain the nut 74 in proper position in the groove 70.

The nut 74 threadably receives therein an elongated screw element 80 which extends to the left therefrom as viewed in the drawings and, as best brought out in Fig. 3, its lefthand end is rotatably received in a bracket 82 fixed to the lefthand end of the table 16 and is suitably maintained against relative axial movement with respect thereto. Thus the movement of the piston 28 in the cylinder 22 is transmitted through the piston rod 32 and screw 80 to the bracket 82 which is fixed to the table 16 and, therefore, causes a corresponding movement of the table 16. An operating handle 84 is fixed to the screw 80 immediately outside of the bracket 82 and, if desired and as illustrated in Fig. 3, a support member 86 arranged in surrounding relation with respect to the screw 80 and fixed to the lefthand face of the saddle 14 by means of screws 88 may be provided for aiding in the support of the righthand end of the screw 74.

The bracket 82 is vertically provided with a central opening in which a screw element 90 is slidably received and fixed to the lower end of the screw element 90 is a ring 92 which rotatably surrounds the cooperating end of the screw shaft 80 within the bracket 82. At the upper end of the bracket 82 a nut 94 is provided with an operating handle 96 which is threadably received upon the screw element 90. Thus with this construction when the nut 94 is drawn down by the handle 96 the ring 92 is raised and brought into binding relation with respect to the associated end of the screw shaft 80 which it surrounds to thus lock it against rotation.

With the relation of the parts illustrated it will be appreciated that the piston 28 is at the extreme lefthand end of its movement and, therefore, is incapable of moving the table 16 any further to the left. If the valve 58 is now operated through the arm 60 to apply fluid pressure through the passage 52 to the lefthand face of the piston 28 and to connect the righthand passage 50 with a source of discharge, the liquid under pressure flowing through the passage 52 into the cylinder 22 will cause the piston 28 to move to the right, causing the table 16 to slide with it, until the righthand end of the piston 28 abuts against the opposed face of the cylinder head 24, the projection 38 being received in the recess 40 of the head 24 prior to actual contact with the piston 28 therewith so as to cushion the final movement of the piston in making such contact.

It will be appreciated that the position of the slide 16 relative to the piston 28 may be varied at any time by loosening the nut 94 and turning the operating handle 84 to turn the screw 80 in the nut 74. Presuming the threads on the screw 80 are righthand threads, then rotation of the handle 84 in a clockwise direction as viewed from the lefthand end of the slide 16 will cause the slide 16 to be advanced toward the piston 28, and movement in the opposite direction of rotation will cause it to move away from the piston 28. Regardless of the relative position of the table 16 and piston 28 the piston 28 will, of course, cause a reciprocatory movement of the table 16 equivalent to the full stroke of piston 28 in the cylinder 22 every time such full stroke of the piston 28 occurs unless the screw is operated during such movement to vary the position of the table 16.

The ability to readily shift the relative position of the table 16 with respect to the piston 28 by operation of the handle 84, in conjunction with the positive stop for movement of the piston 28 by contact with either of the cylinder heads 24 and 26, makes it possible to quickly and accurately position the table 16 so that work carried by the table 16 will be in a predetermined position with respect to a cutting element operating thereon at the time the piston 28 contacts one of the cylinder heads 24 and 26, or when a cutter is carried by the table 16 for operation upon a separately supported piece of work, to limit the movement of the cutter to a predetermined position with respect to such work.

As an illustration it may be assumed, and as illustrated in Fig. 1, that in connection with the particular milling machine shown by way of illustration it is desired to cut a keyway or the like in a shaft such as 90, such keyway to extend a predetermined distance axially of the shaft from one end thereof. Under such circumstances the shaft 90 may be supported between a dividing head such as 92 and a tail stock such as 94 mounted on the table 16 in a conventional manner. A cutter 96 of the required size is mounted upon the spindle 98, the saddle 14 operated to bring the shaft 90 centrally of the cutter 96, and the knee 12 operated to raise or lower the table 16 so as to effect the proper depth of cut of cutter 96 in the work 90. Preferably, and assuming that a number of such shafts 90 are required to be milled in the manner explained, the valve 58 is operated to bring the piston 28 to the righthand end of its movement so that it lies in abutting relation with respect to the cylinder head 24, the nut 94 is released and the handle 84 is operated so as to bring the shaft 90 to the left of the cutter 96, the cutter is rotated and then the handle 84 is turned to cause the table 16 to be fed to the right and thus feed the work 90 into the cutter 96. The handle 84 may be turned and suitable measurements taken until the length of the cut of the cutter 96 in the work 90 is accurately at the desired length, upon which the nut 94 is tightened. The valve 58 is then operated to move the table 16 to the left to bring the work 90 from under the cutter 96, the movement of the table 16 then stopped, and the work 90 removed and replaced by a new piece of work. When the new piece of work is mounted the valve is operated to cause the hydraulic cylinder piston assembly to now move the table 16 to the right to obtain a power feed for the cut. This time when the piston 28 strikes the cylinder head 24 and thus limits further movement of the table 16 to the right, the table 16 and, therefore, the new piece of work 90 which has been mounted thereon will have been moved exactly the distance through which the first piece of work was moved and, consequently, considering the new piece of work 90 to have been mounted in exactly the same longitudinal position as the first piece of work on the table 16, the keyway in the work 90 will be of exactly the desired longitudinal extent.

It will be appreciated that contact of the piston 28 with either cylinder head 24 or 26 may be relied upon to limit the feeding movement of the table 16 in either direction and that the particular extent of the feeding movement of the work carried by the table with respect to a cutter, or a cutter or the like carried by the table with respect to a piece of work, may be quickly and accurately changed through operation of the handle 84 so as to stop the feeding movement between the cutter and the work under the influence of the hydraulic cylinder at any desired point. The mechanism of the present invention, therefore, provides means by which the relative feeding movement between work and a cutter or the like under the influence of a hydraulic cylinder may be terminated at any desired point the position of which may be quickly and accurately varied.

Having thus described my invention what I claim by Letters Patent is:

1. In a machine tool or the like having ways, and a slide reciprocably mounted on said ways for movement longitudinally thereof, in combination, a hydraulic cylinder fixed with respect to said ways in axially parallel relation with respect to the length thereof, a piston reciprocable in said cylinder, a hollow internally threaded rod fixed to said piston and projecting outwardly from said cylinder, a screw threadably engaged with the bore of said rod, a bracket fixed to said slide and rotatably receiving said screw therein, means cooperating with said bracket locking said screw against axial movement with respect to said bracket, and clamping means carried by said bracket engageable with said screw to releasably clamp said screw against rotation.

2. In a machine tool or the like having ways, and a slide reciprocably mounted on said ways for movement longitudinally thereof, in combination, a hydraulic cylinder fixed with respect to said ways in axially parallel relation with respect to the length thereof, a piston reciprocable in said cylinder, a hollow internally threaded rod fixed to said piston and projecting outwardly from said cylinder, a screw threadably engaged with the bore of said rod, a bracket fixed to said slide and rotatably receiving said screw therein, means cooperating with said bracket locking said screw against axial movement with respect to said bracket, a ring surrounding said screw within said bracket, a threaded post fixed to said ring and projecting laterally of said screw outwardly from said bracket, and a nut threaded on said post whereby said ring may be forced laterally of said screw to clamp it against rotation in said bracket.

ALAN P. BEEBE.